United States Patent
Kerschl et al.

(10) Patent No.: US 9,566,854 B2
(45) Date of Patent: Feb. 14, 2017

(54) VEHICLE TRAILER

(71) Applicant: MAN Truck & Bus AG, Munich (DE)

(72) Inventors: Stefan Kerschl, Kranzberg (DE); Goetz Von Esebeck, Mahlow (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/336,103

(22) Filed: Jul. 21, 2014

(65) Prior Publication Data

US 2015/0060160 A1    Mar. 5, 2015

(30) Foreign Application Priority Data

Aug. 29, 2013    (DE) .................. 10 2013 014 305

(51) Int. Cl.
| | |
|---|---|
| *B60K 1/04* | (2006.01) |
| *B60L 11/12* | (2006.01) |
| *B60R 16/033* | (2006.01) |
| *B62D 59/04* | (2006.01) |
| *B60D 1/64* | (2006.01) |
| *B60L 9/00* | (2006.01) |
| *B62D 53/00* | (2006.01) |
| *B60L 11/14* | (2006.01) |
| *B60L 11/18* | (2006.01) |

(Continued)

(52) U.S. Cl.
CPC . *B60K 1/04* (2013.01); *B60D 1/64* (2013.01); *B60L 9/00* (2013.01); *B60L 11/123* (2013.01); *B60L 11/14* (2013.01); *B60L 11/1803* (2013.01); *B60L 11/1816* (2013.01); *B60L 11/1861* (2013.01); *B60L 11/1868* (2013.01); *B60L 15/32* (2013.01); *B60L 15/38* (2013.01); *B60R 16/033* (2013.01); *B62D 53/00* (2013.01); *B62D 59/04* (2013.01); *B60K 2001/0444* (2013.01); *B60L 2200/28* (2013.01); *B60Y 2200/147* (2013.01); *B60Y 2200/148* (2013.01); *Y02T 10/6217* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 90/14* (2013.01)

(58) Field of Classification Search
CPC ..... B60D 1/64; B60K 1/04; B60K 2001/0444; B60L 11/12; B60L 11/123; B60R 16/033; B60Y 2200/147; B60Y 2200/148
USPC .............. 180/14.1, 14.2, 14.3, 14.4; 280/408
See application file for complete search history.

(56) References Cited

U.S. PATENT DOCUMENTS

| | | |
|---|---|---|
| 6,390,215 B1 | 5/2002 | Kodama et al. |
| 7,338,335 B1 | 3/2008 | Messano |

(Continued)

FOREIGN PATENT DOCUMENTS

| | | |
|---|---|---|
| DE | 102010056179 A1 | 7/2011 |
| DE | 102011083216 A1 | 5/2013 |

(Continued)

*Primary Examiner* — Naeem Haq
*Assistant Examiner* — Felicia L Brittman
(74) *Attorney, Agent, or Firm* — Lucas & Mercanti, LLP

(57) ABSTRACT

A vehicle trailer for a tractive unit, in particular in the form of a semitrailer or a drawbar trailer, has at least one electric drive system component which is integrated into the vehicle trailer and can be coupled to an electric drive system of the tractive unit. The at least one electric drive system component has an electric energy store that can be coupled to the electric drive system through an interface.

21 Claims, 3 Drawing Sheets

(51) Int. Cl.
   *B60L 15/32*   (2006.01)
   *B60L 15/38*   (2006.01)

(56) References Cited

U.S. PATENT DOCUMENTS

| | | |
|---|---|---|
| 8,004,242 B1 | 8/2011 | Purkey et al. |
| 9,242,570 B2 | 1/2016 | Kim |
| 2011/0100735 A1 | 5/2011 | Flett |
| 2011/0114398 A1* | 5/2011 | Bianco .......................... 180/65.1 |
| 2011/0253463 A1 | 10/2011 | Smith |

FOREIGN PATENT DOCUMENTS

| | | | |
|---|---|---|---|
| EP | 0947376 A1 | | 10/1999 |
| GB | 2486474 A | * | 6/2012 |
| WO | 2010002644 A1 | | 1/2010 |
| WO | 2013092223 A1 | | 6/2013 |

* cited by examiner

000# VEHICLE TRAILER

CROSS REFERENCE TO RELATED APPLICATION

This Application claims the priority of German Patent Application No. 10 2013 014 305.5 filed Aug. 29, 2013.

BACKGROUND OF THE INVENTION

The invention relates to a vehicle trailer for a tractive unit, in particular a semitrailer or a drawbar trailer. The invention also relates to a vehicle combination having a tractive unit and a vehicle trailer.

Utility vehicles (for example lorries) which have an electric drive system which is supplied with electrical energy by an accumulator integrated into the utility vehicle are known from the prior art. A disadvantage thereof is, on the one hand, the limited capacity of the accumulator and the correspondingly limited range of the utility vehicle. A further disadvantage of the known utility vehicles with an electric drive system is the fact that such utility vehicles are usually configured only for operation without a trailer, which leads to corresponding problems during operation with a trailer.

BRIEF SUMMARY OF THE INVENTION

The invention is therefore based on the object of at least partially eliminating the disadvantages mentioned above.

The invention comprises the general technical teaching of integrating an electric drive system component (for example an accumulator) into a vehicle trailer (for example semitrailer or drawbar trailer) it being possible to couple said electric drive system component to an electric drive system of the tractive unit. When the vehicle trailer is hitched to the tractive unit, that is to say, on the one hand, a mechanical connection is produced between the tractive unit and the vehicle trailer in a conventional fashion. Furthermore, in this context an electrical connection is also produced between, on the one hand, the electric drive system in the tractive unit and, on the other, the electric drive system component which is integrated into the vehicle trailer.

In one preferred exemplary embodiment of the invention, the drive system components which are integrated into the vehicle trailer have an electric energy store which can be coupled to the electric drive system of the vehicle trailer in order to supply power to the electric drive system of the tractive unit. For example, the electric energy store can have an accumulator (for example lithium-ion accumulator) or a fuel cell. The electric energy store in the vehicle trailer therefore supports the electric energy store in the tractive unit, as a result of which the range of the entire vehicle combination is increased. The splitting of the energy storage system between an electric energy store in the tractive unit and an electric energy store in the vehicle trailer is also advantageous in terms of vehicle dynamics since in this way more uniform distribution of weight is achieved. Furthermore, the energy store in the vehicle trailer also permits stand-alone operation of the vehicle trailer in the unhitched state, for example in order to supply electric assemblies (for example electric motor for driving a cooling compressor, a sliding floor or a hydraulic platform).

In a preferred exemplary embodiment of the invention, the electric energy store which is integrated into the vehicle trailer has a high-voltage store and a low-voltage store. The term high-voltage store used within the scope of the invention preferably relates to energy stores with a rated voltage of more than 60V. In contrast, the term low-voltage store used within the scope of the invention preferably relates to energy stores with a rated voltage of less than 60V.

In order to connect electrically the drive system components which are integrated into the vehicle trailer to the electric drive system of the tractive unit, the vehicle trailer preferably has a first interface. Furthermore, the vehicle trailer can additionally have a second interface if a further vehicle trailer can be hitched to the vehicle trailer, wherein the second interface can then produce an electrical connection to the drive system components in the further vehicle trailer. The invention can thus also be implemented in vehicle combinations with a plurality of vehicle trailers (for example what are referred to as "road trains" or "long combination vehicles") which are coupled behind one another, wherein each vehicle trailer of the vehicle combination can have integrated drive system components (for example accumulators).

In a preferred exemplary embodiment of the invention, the interfaces preferably have a power interface and a communication interface, wherein the power interface serves to transmit electrical energy, while the communication interface serves to transmit data.

Furthermore, the drive system components which are integrated in the vehicle trailer preferably include a distributor. In order to be able to distribute electrical energy. For example, the first interface and/or the second interface can be connected to the distributor in order to be able to distribute electrical energy between the electric drive system in the tractive unit and the drive system component or components in the vehicle trailer or trailers. Therefore, the energy store in the vehicle trailer is preferably also connected to the distributor. Furthermore, an electric assembly (for example electric motor for driving a cooling compressor, a sliding floor or a hydraulic platform) can also be connected to the distributor so that the electric assembly in the vehicle trailer can be supplied with current from the energy store which is integrated into the vehicle trailer.

In this context it is also possible for the distributor to carry out insulation monitoring or interlock monitoring, wherein these functions are known per se from the prior art and therefore do not need to be described in more detail.

In addition, the vehicle trailer preferably has a first direct voltage transformer which is arranged between the energy store integrated into the vehicle trailer and the first interface, in particular between the energy store and the distributor.

In the invention variant described above having a high-voltage store and a low-voltage store, the high-voltage store and the low-voltage store are preferably connected to the distributor by one direct voltage transformer each.

In contrast, the supply to the additional electrical assembly (for example electric motor for driving a cooling compressor, a sliding floor or a hydraulic platform) is preferably provided by an inverter which is arranged between the distributor and the electrical assembly.

Furthermore, the vehicle trailer preferably has an integrated control unit in order to control the drive system components which are integrated into the vehicle trailer. For example, the integrated control unit can control the charging and discharging of the integrated energy store. Furthermore, the integrated control unit can control the flow of energy via the first interface to the tractive unit and/or via the second interface to the further vehicle trailer. Furthermore, within the scope of the invention there is the possibility of the integrated control unit controlling the direct voltage transformer or the inverter. Generally, it is the case that the integrated control unit can control an energy management in the vehicle trailer.

Furthermore, it is to be noted that the invention claims protection not only for the inventive vehicle trailer described above having an integrated drive system component, but also for a vehicle combination with a tractive unit and a correspondingly configured vehicle trailer.

The tractive unit preferably has a control unit in order to control the energy management of the electric drive system of the tractive unit. Furthermore, the control unit which is located in the tractive unit can also control the energy management of the drive system components in the vehicle trailer.

One possibility for this is that the control unit in the tractive unit controls, as a master control unit, the control unit in the vehicle trailer, which then operates as a slave control unit.

Another possibility is that the control unit for the energy management is not arranged in the vehicle trailer itself, with the result that in the hitched state of the vehicle trailer the control unit in the tractive unit also controls the energy management in the vehicle trailer, with the result that it is possible to dispense with a separate control unit in the vehicle trailer.

In addition it is to be noted that the electric drive system of the tractive unit can operate fully electrically or partially electrically. For example, the electric drive system in the tractive unit can have a hybrid drive which has both an internal combustion engine and an electric motor. However, the scope of the invention also includes the possibility of the electric drive system of the tractive unit operating fully electrically, i.e. with an electric motor but without an internal combustion engine. Furthermore, various other variants of an electric drive system are also possible, but this is not particularly significant for the invention and therefore does not have to be described in more detail.

However, it is to be noted that the vehicle trailer itself preferably does not have a separate drive but is instead pulled by the tractive unit.

Furthermore it is to be noted that the energy store in the vehicle trailer preferably has such a large capacity that it gives rise to an appreciable increase in range. The capacity of the energy store in the vehicle trailer therefore preferably comprises at least 10%, 20%, 50% or even 100% of the capacity of the energy store in the tractive unit. As a result, the vehicle trailer according to the invention also differs from conventional vehicle trailers which merely have an auxiliary battery which, however, cannot be coupled to the electric drive system of the tractive unit and, owing to its small capacity, would also not be suitable for assisting an electric drive system.

Finally, it is to be noted that the invention is not restricted to utility vehicles such as, for example, lorries (for example semitrailers with a semitrailer tractor and a trailer unit, articulated vehicles with a pulling lorry and a drawbar trailer) or busses. Instead, the invention can generally be used in road vehicles and wheeled vehicles (for example passenger cars with a trailer).

BRIEF DESCRIPTION OF THE DRAWINGS

Other advantageous developments of the invention are characterized in the dependent claims or are explained in more detail below together with the description of the preferred exemplary embodiments of the invention with reference to the figures, in which:

DETAILED DESCRIPTION OF THE PREFERRED EMBODIMENTS

Figure 1:
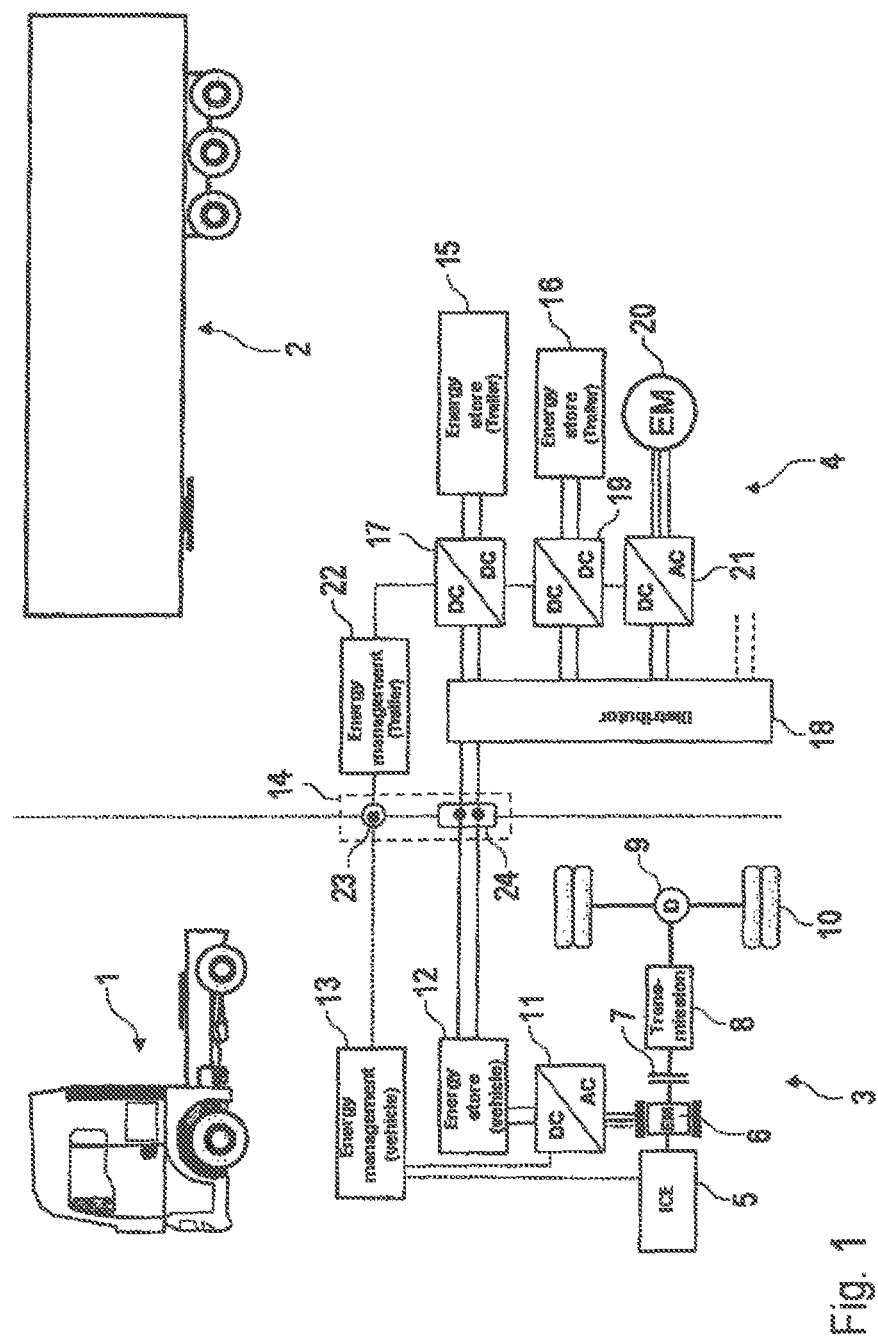
FIG. 1 is a schematic diagram showing a vehicle combination composed of a tractor and a semitrailer, wherein electric drive system components are integrated into the semitrailer.

FIG. 1 shows a preferred exemplary embodiment of the invention in the form of a vehicle combination which is composed of a tractor 1 and a semitrailer 2, wherein the tractor 1 has an electric drive system 3 which can be coupled to drive system components 4 in the semitrailer 2 and cooperates with them during operation.

The electric drive system 3 in the tractor 1 has an internal combustion engine 5 (for example diesel engine) and an electric motor 6 which act in a common drive train on a differential 9 of a driven axle 10 via a clutch 7 and a transmission 8, and as a result drive the tractor 1. However, the invention is not restricted to the illustrated axle configuration. The tractor 1 can therefore also have a relatively large number of axles which do not all have to be driven.

The electric motor 6 is supplied with electrical energy from an electric energy store 12 (for example lithium-ion accumulator) via an inverter 11.

Furthermore, the electric drive system 3 in the tractor 1 has a control unit 13 which is connected to the inverter 11 and to the internal combustion engine 5 as well as to an interface 14, wherein the control unit 13 controls the energy management of the electric drive system 3.

The drive system components 4 which are integrated into the semitrailer 2 comprise a high-voltage store 15 and a low-voltage store 16, wherein the high-voltage store 15 is connected to a distributor 18 via a direct voltage transformer 17, while the low-voltage store 16 is connected to the distributor 18 via a further direct voltage transformer 19.

Furthermore, the semitrailer 2 has an electric assembly 20 which may be, for example, an electric motor for driving a cooling compressor, a sliding floor or a hydraulic platform. The electric assembly 20 is likewise connected to the distributor 18 via a rectifier inverter 21.

Furthermore, the drive system components 4 which are integrated into the semitrailer 2 comprise a control unit 22 which controls the energy management in the semitrailer 2.

In one embodiment, the distributor 18 and/or the control unit monitor insulation of the semitrailer 2 and/or monitor of an interlock at the interface 14.

The two control units 13, 22 are connected to one another via a communication interface 23 in the interface 14. In this context, it is possible that in the coupled state the control unit 13 in the tractor 1 operates as a master control unit and controls the control unit 22 in the semitrailer 2 via the communication interface 23, wherein the control unit 22 in the semitrailer then operates as a slave control unit.

Furthermore, the interface 14 also comprises a power interface 24 which connects the energy store 12 in the tractor 1 to the distributor 18 in the semitrailer 2 and permits a flow of energy between the tractor 1 and the semitrailer 2, specifically preferably in a bidirectional fashion.

On the one hand, the electric drive system 3 in the tractor 1 can therefore charge the high-voltage store 15 and/or the low-voltage store 16 in the semitrailer 2 via the power interface 24.

On the other hand, the electric motor 6 in the tractor 1 can, however, also be supplied with current from the high-voltage store 15 in the semitrailer 2, which contributes to a corresponding increase in the maximum possible range.

Figure 2:
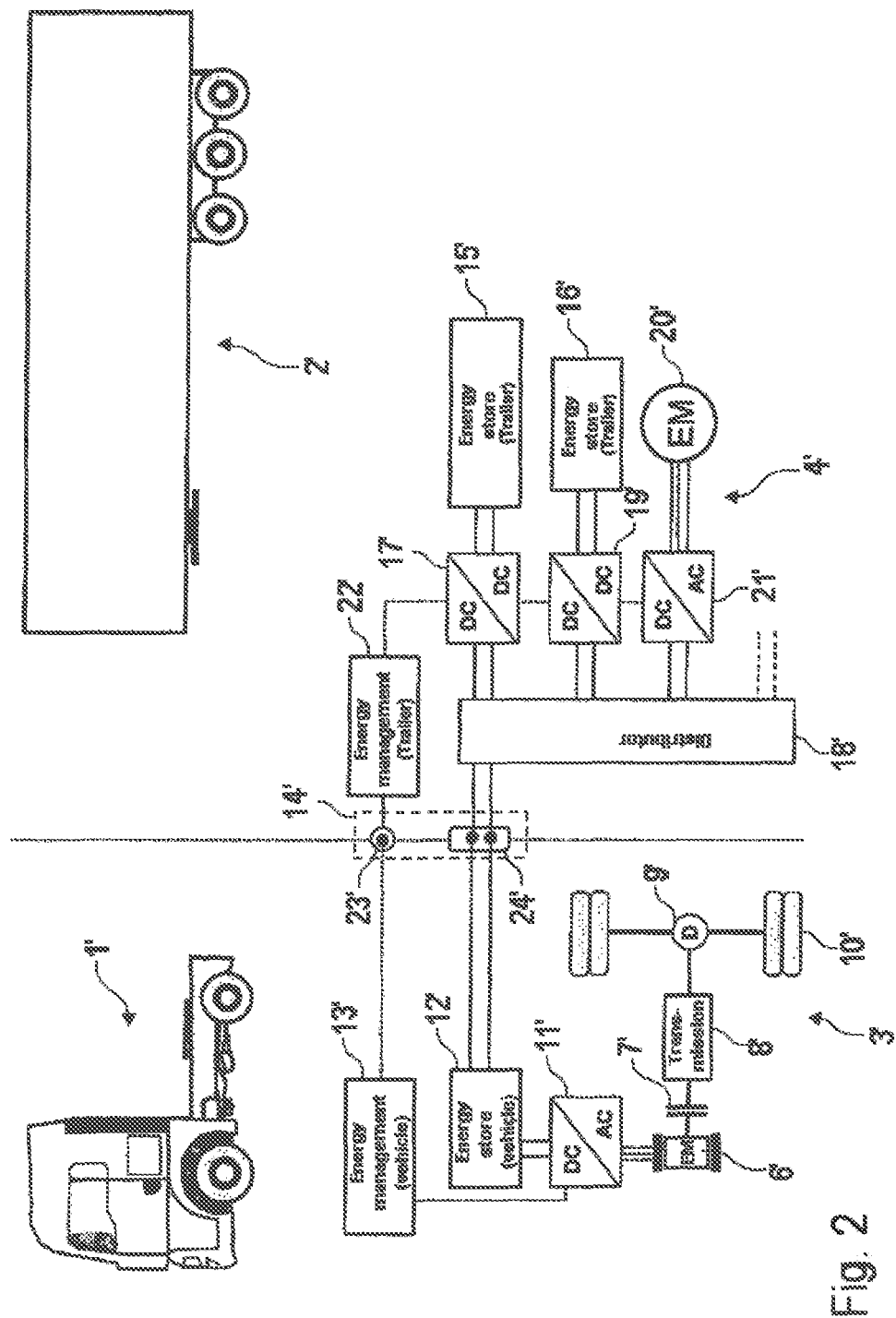
FIG. 2 is a schematic diagram showing another embodiment of the vehicle combination of FIG. 1 with a fully electric drive of the tractor without an internal combustion engine.

The exemplary embodiment according to FIG. 2 corresponds largely to the exemplary embodiment described above and illustrated in FIG. 1, with the result that in order to avoid repetitions reference is made to the description above, wherein the same reference symbols are used for corresponding details, but in order to differentiate them they are characterized by an apostrophe.

One particular feature of this exemplary embodiment is that the electric drive machine 3' of the tractor 1' is embodied in a fully electric fashion, with the result that it is possible to dispense with the internal combustion engine 5 according to FIG. 1.

Figure 3:
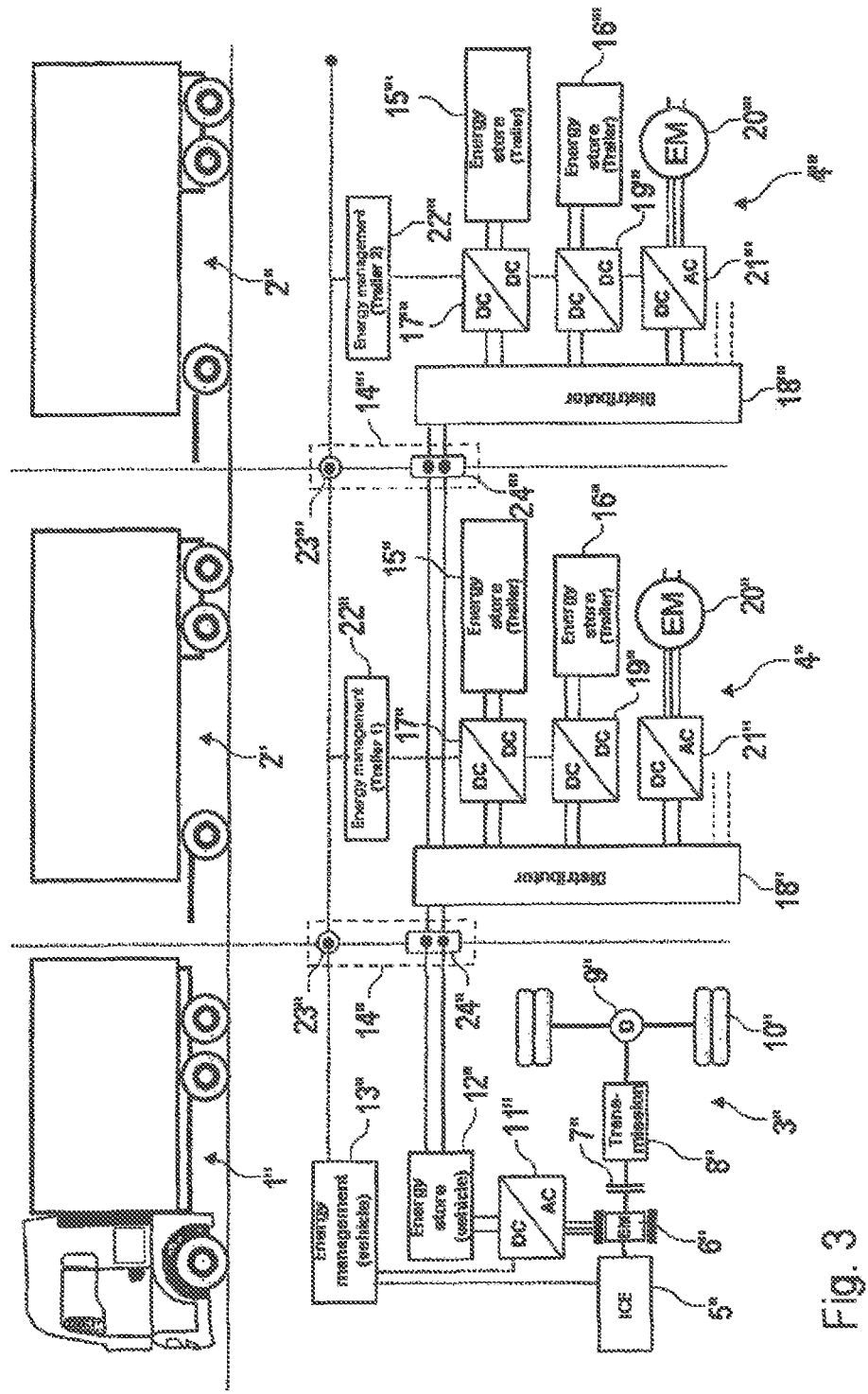
FIG. 3 is a schematic diagram showing a vehicle combination with a tractive unit and two drawbar trailers, wherein the drawbar trailers each have integrated drive system components.

The exemplary embodiment according to FIG. 3 also corresponds largely to the exemplary embodiment according to FIG. 1, with the result that in order to avoid repetitions reference is made to the description above, wherein the same reference symbols are used for corresponding details, but in order to differentiate them they are characterized by two or three apostrophes.

One particular feature of this exemplary embodiment is that the vehicle combination is pulled by a 3 three-axle lorry 1" instead of the tractor 1 according to FIG. 1.

A further particular feature of this exemplary embodiment is that the lorry 1" pulls a three-axle drawbar trailer 2" instead of the semitrailer 2 according to FIG. 1.

Furthermore, it is to be noted that a further drawbar trailer 2' is coupled to the drawbar trailer 2".

Finally, it is to be noted that drive system components 4''' are also integrated into the second drawbar trailer 2'''.

The drive system components 4''' in the second drawbar trailer 2''' are connected to the drive system components 4" in the first drawbar trailer 2" via a corresponding interface 1440 ".

The invention is not restricted to the preferred exemplary embodiments described above. Instead, a multiplicity of variants and refinements are possible which also make use of the inventive concept and therefore fall within the scope of protection. In particular, the invention also claims protection for the subject matter and the features of the dependent claims independently of the claims referred to and, in particular, independently of the features of the main claim.

LIST OF REFERENCE NUMERALS 1, 1' Tractor
1" Lorry
2; 2'; Semitrailer
2"; 2"" Drawbar trailer
3; 3'; 3" Electric drive system
4; 4'; 4"; 4''' Drive system components
5; 5" Internal combustion engine
6; 6'; 6" Electric motor
7; 7'; 7" Clutch
8; 8'; 8" Transmission
9; 9'; 9" Differential
10; 10'; 10" Driven axle
11; 11'; 11" Inverter
12; 12'; 12" Energy store
13; 13'; 13" Control unit
14; 14'; 14"; 14''' Interface
15; 15'; 15" High-voltage store
16; 16'; 16" Low-voltage store
17; 17'; 17" Direct voltage transformer
18; 18'; 18"; 18''' Distributor
19; 19'; 19" Direct voltage transformer
20; 20'; 20" Electric assembly
21; 21'; 21" Rectifier
22; 22'; 22"; 22''' Control unit
23; 23'; 23"; 23''' Communication interface
24; 24'; 24"; 24" Power interface

What we claim is:

1. A vehicle trailer connectable to a tractive unit, which has an electric drive system for driving the tractive unit so that the vehicle trailer can be hauled by the tractive unit, the vehicle trailer comprising:
at least one electric drive system component integrated into the vehicle trailer, the at least one electric drive system component comprising at least one of:
an electric energy store which can be coupled to the electric drive system of the tractive unit in order to supply power to the electric drive system of the tractive unit,
a rechargeable accumulator,
a fuel cell;
a control unit controlling operation of the at least one electric drive system component; and
an interface connected to the at least one electric drive system component and the control unit, the interface being connectable to the electric drive system of the tractive unit so that the at least one electric drive system component and the control unit can be coupled to the electric drive system of the tractive unit through the interface,
wherein the at least one electric drive system component includes at least one of an electric assembly and an energy store including at least one of a high-voltage store and a low voltage store, the at least one electric drive system component further comprising a distributor that distributes energy between the electric drive system in the tractive unit and the at least one of the electric assembly and the energy store,
the interface includes a first interface for electrically connecting the at least one electric drive system component in the vehicle trailer to the electric drive system of the tractive unit and a second interface for electrically connecting the at least one electric drive system component in the vehicle trailer to a further drive system component in a further vehicle trailer, and
the distributor further distributes energy between the further drive system component in the further vehicle trailer via the second interface and the at least one of the electric assembly and the energy store of at least one electric drive system component.

2. The vehicle trailer according to claim 1, wherein the at least one electric drive system component integrated into the vehicle trailer comprises at least one of:
a high-voltage electric energy store with a rated voltage of more than 60V; and
a low-voltage electric energy store with a rated voltage of less than 60V.

3. The vehicle trailer according to claim 1, wherein the interface comprises a power interface and a communication interface, the power interface serving to transmit electrical energy, and the communication interface serving to transmit data.

4. The vehicle trailer according to claim 1, wherein the distributor is further configured to provide at least one of insulation monitoring and interlock monitoring.

5. The vehicle trailer according to claim 1, wherein the at least one electric drive system component includes the energy store and a first direct voltage transformer connected between the energy store and the distributor.

6. The vehicle trailer according to claim 5, wherein the energy store includes a high-voltage store and a low-voltage store,
the first direct voltage transformer is arranged between the distributor and the high-voltage store, and
a second direct voltage transformer is arranged between the distributor and the low-voltage store.

7. The vehicle trailer according to claim 1, wherein the at least one electric drive system component includes the electric assembly, which is an electric motor for driving a cooling compressor, a sliding floor or a hydraulic platform.

8. The vehicle trailer according to claim 7, further comprising an inverter for supplying the electric motor with an alternating current.

9. The vehicle trailer according to claim 1, wherein the control unit controls at least one of:
charging of the energy store integrated into the vehicle trailer,
discharging of the energy store,
energy flow via the interface,
the electric assembly, and
the distributor.

10. The vehicle trailer according to claim 1, wherein the at least one electric drive system component includes a high-voltage energy store, a low-voltage energy store, and an electric motor, a first direct voltage transformer arranged between the distributor and the high-voltage energy store, a second direct voltage transformer arranged between the distributor and the low-voltage store, and an inverter for supplying the electric motor with an alternating current, and the control unit controls at least of one
charging of the high-voltage energy store and the low-voltage energy store,
discharging of the high-voltage energy store and the low-voltage energy store,
energy flow via the interface,
the electric motor,
the distributor,
the first direct voltage transformer,
the second direct voltage transformer, and
the inverter.

11. A vehicle combination, comprising:
a tractive unit with an electric drive system for driving the tractive unit, and
a vehicle trailer according to claim 1, wherein the vehicle trailer is mechanically coupled to the tractive unit, and the electric drive system of the tractive unit is electrically connected to the at least one electric drive system component in the vehicle trailer.

12. The vehicle combination according to claim 11, wherein:
the control unit of the vehicle trailer controls energy management of the at least one electric drive system component in the vehicle trailer, and
the tractive unit comprises a separate control unit connected via the interface to the control unit in the vehicle trailer, and
the control unit in the tractive unit controls energy management of the electric drive system of the tractive unit, and
the control unit in the tractive unit controls, as a master control unit, the control unit in the vehicle trailer, which operates as a slave control unit when the vehicle trailer is coupled to the tractive unit.

13. The vehicle combination as claimed in claim 11, wherein the tractive unit has a control unit connected via the interface to the at least one electric drive system component in the vehicle trailer and controls energy management of the at least one electric drive system component in the vehicle trailer.

14. The vehicle combination according to claim 11, wherein the electric drive system of the tractive unit is one of:
a hybrid drive with an internal combustion engine and an electric motor, or
a fully electric drive with an electric motor without an internal combustion engine.

15. The vehicle combination according to claims 11, wherein the at least one electric drive system component includes an energy store and the electric drive system includes a separate energy store, the energy store in the vehicle trailer has a capacity of at least 10% of the capacity of the separate energy store of the electric drive system in the tractive unit.

16. A vehicle trailer connectable to a tractive unit, which has an electric drive system for driving the tractive unit so that the vehicle trailer can be hauled by the tractive unit, the vehicle trailer comprising:
at least one electric drive system component integrated into the vehicle trailer, the at least one electric drive system component comprising at least one of:
an electric energy store which can be coupled to the electric drive system of the tractive unit in order to supply power to the electric drive system of the tractive unit,
a rechargeable accumulator,
a fuel cell;
a control unit controlling operation of the at least one electric drive system component; and
an interface connected to the at least one electric drive system component and the control unit, the interface being connectable to the electric drive system of the tractive unit so that the at least one electric drive system component and the control unit can be coupled to the electric drive system of the tractive unit through the interface,
wherein the at least one electric drive system component includes at least one of an electric assembly and an energy store including at least one of a high-voltage store and a low voltage store, the at least one electric drive system component further comprising a distributor that distributes energy between the electric drive system in the tractive unit and the at least one of the electric assembly and the energy store, and
the distributor is further configured to provide at least one of insulation monitoring and interlock monitoring.

17. The vehicle trailer according to claim 16, wherein the interface comprises a first interface for electrically connecting the at least one electric drive system component in the vehicle trailer to the electric drive system of the tractive unit, and a second interface for electrically connecting the at least one electric drive system component in the vehicle trailer to a further drive system component in a further vehicle trailer.

18. The vehicle trailer according to claim 17, wherein the control unit controls:
energy flow via the first interface, and
energy flow via the second interface.

19. A vehicle trailer connectable to a tractive unit, which has an electric drive system for driving the tractive unit so that the vehicle trailer can be hauled by the tractive unit, the vehicle trailer comprising:
- at least one electric drive system component integrated into the vehicle trailer, the at least one electric drive system component comprising at least one of:
  - an electric energy store which can be coupled to the electric drive system of the tractive unit in order to supply power to the electric drive system of the tractive unit,
  - a rechargeable accumulator,
  - a fuel cell;
- a control unit controlling operation of the at least one electric drive system component; and
- an interface connected to the at least one electric drive system component and the control unit, the interface being connectable to the electric drive system of the tractive unit so that the at least one electric drive system component and the control unit can be coupled to the electric drive system of the tractive unit through the interface,
- wherein the at least one electric drive system component includes an energy store including at least one of a high-voltage store and a low voltage store, the at least one electric drive system component further comprising a distributor that distributes energy between the electric drive system in the tractive unit and the energy store, and
- the at least one electric drive system component includes a first direct voltage transformer connected between the energy store and the distributor.

20. The vehicle trailer according to claim 19, wherein the energy store includes a high-voltage store and a low-voltage store,
- the first direct voltage transformer is arranged between the distributor and the high-voltage store, and
- a second direct voltage transformer is arranged between the distributor and the low-voltage store.

21. A vehicle trailer connectable to a tractive unit, which has an electric drive system for driving the tractive unit so that the vehicle trailer can be hauled by the tractive unit, the vehicle trailer comprising:
- at least one electric drive system component integrated into the vehicle trailer, the at least one electric drive system component comprising at least one of:
  - an electric energy store which can be coupled to the electric drive system of the tractive unit in order to supply power to the electric drive system of the tractive unit,
  - a rechargeable accumulator,
  - a fuel cell;
- a control unit controlling operation of the at least one electric drive system component; and
- an interface connected to the at least one electric drive system component and the control unit, the interface being connectable to the electric drive system of the tractive unit so that the at least one electric drive system component and the control unit can be coupled to the electric drive system of the tractive unit through the interface,
- wherein the at least one electric drive system component includes at least one of an electric assembly and an energy store including at least one of a high-voltage store and a low voltage store, the at least one electric drive system component further comprising a distributor that distributes energy between the electric drive system in the tractive unit and the at least one of the electric assembly and the energy store, and
- the at least one electric drive system component includes a high-voltage energy store, a low-voltage energy store, and an electric motor, a first direct voltage transformer arranged between the distributor and the high-voltage energy store, a second direct voltage transformer arranged between the distributor and the low-voltage store, and an inverter for supplying the electric motor with an alternating current, and the control unit controls at least of one
- charging of the high-voltage energy store and the low-voltage energy store,
- discharging of the high-voltage energy store and the low-voltage energy store,
- energy flow via the interface,
- the electric motor,
- the distributor,
- the first direct voltage transformer,
- the second direct voltage transformer, and
- the inverter.

* * * * *